US005773066A

United States Patent [19]

Satake et al.

[11] Patent Number: 5,773,066

[45] Date of Patent: Jun. 30, 1998

[54] METHOD AND APPARATUS FOR CARRYING OUT PRE-TREATMENT OF WHEAT GRAINS FOR FLOUR MILLING

[75] Inventors: Satoru Satake, Tokyo; Shigeharu Kanemoto, Hiroshima; Nobuhiro Matsumoto, Hiroshima; Akihiko Kato, Hiroshima; Yoshihiro Tokui, Hiroshima; Satoru Takashita, Hiroshima; Kaoru Shitadera, Hiroshima; Hiroyuki Maehara, Hiroshima, all of Japan

[73] Assignee: Satake Corporation, Tokyo, Japan

[21] Appl. No.: 795,654

[22] Filed: Feb. 7, 1997

[30] Foreign Application Priority Data

| | | | |
|---|---|---|---|
| Feb. 9, 1996 | [JP] | Japan | 8-048069 |
| May 10, 1996 | [JP] | Japan | 8-140635 |

[51] Int. Cl.$^6$ ..... A23P 1/00; B02B 3/00; B02B 1/00

[52] U.S. Cl. ..... 426/483; 99/487; 99/518; 99/602; 426/507; 426/622

[58] Field of Search ..... 426/481, 483, 426/507, 518, 622; 99/518, 519, 520, 525, 528, 602, 605, 613, 487

[56] References Cited

U.S. PATENT DOCUMENTS

| | | | |
|---|---|---|---|
| 4,133,899 | 1/1979 | Wolffing et al. | 426/507 |
| 4,741,913 | 5/1988 | Satake | 426/483 |
| 5,002,788 | 3/1991 | Satake | 426/483 |

FOREIGN PATENT DOCUMENTS

| | | | |
|---|---|---|---|
| 0 529 843 A1 | 3/1993 | European Pat. Off. | B02C 9/04 |
| 2 685 222-A1 | 6/1993 | France | B02C 23/08 |
| 6-86943 | 3/1994 | Japan . | |

*Primary Examiner*—George Yeung
*Attorney, Agent, or Firm*—Fish & Richardson P.C.

[57] ABSTRACT

Raw wheat grains are polished after being subjected to a first water addition and being tempered, and the polished wheat grains are ground after being subjected to a second water addition and being tempered. The first water addition is to cause the raw wheat grains to have a water content of 12–14%. The tempering of the raw wheat grains is performed for 16–36 hours so that the water sufficiently penetrate into the inside of the raw wheat grains. The method of flouring includes the steps of measuring a water content of the flour obtained by the grinding of the grains, comparing the amount of the measured water content with a predetermined target water content of the flour, and adjusting the amount of water to be added during the second water addition if there is a difference between the measured water content and the predetermined target water content. Thus, it is possible to reduce the time required for the tempering of the polished wheat grains and to adjust the second water addition based on the water content in the flour.

16 Claims, 5 Drawing Sheets

METHOD AND APPARATUS FOR CARRYING OUT PRE-TREATMENT OF WHEAT GRAINS FOR FLOUR MILLING

BACKGROUND OF THE INVENTION (1) Field of the Invention

The present invention relates to a method and an apparatus for flour milling wheat grains, and more particularly to a method and an apparatus for carrying out a pretreatment of wheat grains for the milling of the grains.

(2) Description of the Related Art

As a pre-treatment for the milling process to produce flour (end flour), it is general practice to add water for conditioning wheat grains.

Normally, the conditioning or tempering process is carried out by adding water twice (a first and a second water addition) followed by tempering twice (a first and a second tempering). The purpose of the conditioning process is to make a coarse adjustment of water content in the wheat grains by the first water addition and the first tempering, and then to attain the target water content by the second water addition and the second tempering, whereby flour characteristics are enhanced and the water content of the end flour produced by the milling process is made to be suited to the final use characteristics of the end flour.

Even when a sufficient tempering process has been applied to the wheat grains, there often arises a difference between the water content of the end flour and the target water content due to, for example, loss of water content or change in atmospheric conditions. The problem that arises is that, if the water content of the end flour is lower than the water content of the target water content, the yield of the end flour is lowered while, if the water content of the end flour is higher than the target water content, it becomes necessary to adjust the water content of the end flour. Thus, there is a demand for a flour milling method and apparatus in which it is possible to detect the water content in the end flour and adjust, based on the detected water content, the water content of the wheat grains before the flour milling.

In order to carry out the feedback control in which, as described above, the water content of the end flour obtained by the milling process is detected and the amount of the water to be added to the wheat grain before the milling process is adjusted, it is important that the time from the second water addition to the detection of the water content in the end flour be short. However, in the flour milling process in which the unpolished wheat grains (hereinafter referred to as "raw wheat grains") are subjected to a tempering process followed by a direct milling or grinding process, the absorption of water at the epidermis takes time, and this requires as long as about 10 hours during the second tempering after the second water addition, and this makes it difficult to carry out the feedback control.

As a way to overcome the above problem, a method conceivable is to expose the endosperm by removing the epidermis of raw wheat grains followed by a flour milling process (a polished grain milling method).

The applicant of the present application has filed a patent application (Japanese Patent Application Kokai Publication No. Hei 6-86943) in which is disclosed a flour milling method and apparatus for removing the epidermis of raw wheat grains as a pre-treatment process of the flour milling. The flour milling method and apparatus disclosed is explained hereinafter with reference to FIG. 1.

As pre-treatment means before a milling unit 150, there are sequentially provided a polishing unit 151, a grain cleaning unit 152, a stirring unit 153, and a tempering tank 154 as a tempering means. Also, as pre-treatment means before the polishing unit 151, there are provided a separator unit 155, a water adding unit 156 and a tempering tank 157.

From the raw wheat grains introduced into the separator unit 155, a coarse separator 158 removes straws and other comparatively light contaminants contained in the raw wheat grains, and a stone remover 159 removes other contaminants such as stone and metal pieces. The raw wheat grains are then transported into the water adding unit 156 where the water in an amount of 1–3% by weight is added on the grain surfaces while being controlled by an electromagnetic valve 160. The raw wheat grains to which the water has been added are directly supplied or supplied after being tempered for 5–20 minutes at the tempering tank 157 to the polishing unit 151. Then, the wheat grains are polished so that their polishing yield becomes 85–94% and are moved into the cleaning unit 152. At the cleaning unit 152, the water in an amount of 5–10% by weight is added to the flowing-in polished grains while being controlled by an electromagnetic valve 161. There, by the rotation of a screw 162, after the crease of the bran (the epidermis removed from the wheat grains) is cleaned and removed and is subjected to water addition for the water content to become 15–17%, the polished grains are moved into an elevating screw conveyor 163 of the stirring unit 153. The polished grains to which the water has been added are elevated while being stirred by the screw 164 of the elevating screw conveyor 163 so that they do not stick together, and are introduced into the tempering tank 154 while being subjected to a stirring action of the screw 166 of a horizontal conveyor 165. The polished grains in the tempering tank 154 are left alone and tempered for 4–6 hours, and then are introduced into an adjusting tank 169 of the milling unit 150 through an elevator 167 and a horizontal conveyor 168. Then, 0.5–2.5 hours before the first milling process is carried out by a first break roll machine 170 of the milling unit 150, the atomized water is sprayed by a water adding nozzle 171 on the grains which are then fed into the first break roll machine 170. There, the grains are milled and the end flour is produced.

In the flour milling method described above, by carrying out the second water addition to the polished grains in which the endosperm is exposed due to the polishing, the time required for the second tempering can be made shorter than that for the raw wheat grains. However, since the first water addition is given only to the surface of the grains, the water content of the polished grains is low so that, for the polished grains to have the target water content, the amount of water in the second water addition must be large and the second tempering requires at least four hours. Thus, this leads to a problem that the feedback control as explained above cannot be carried out effectively.

Also, since the second tempering requires at least four hours, most of the water in the epidermis of the polished grains penetrates into the endosperm thus causing the epidermis to be in a dried state. This leads to a problem that the water must be added again to the grains immediately prior to the milling process of the grains.

SUMMARY OF THE INVENTION

In view of the problems discussed above, the present invention aims at providing a flour milling method and apparatus in which the time required for the second tempering can be made short and the amount of water to be added in the second water addition can be controlled based on the water content of the end flour.

According to one aspect of the invention, there is provided a method of flour milling in which raw wheat grains are polished after being subjected to a first water addition and being tempered, and the polished wheat grains are ground after being subjected to a second water addition and being tempered, the method comprising the steps of:

adding water during the first water addition to cause the raw wheat grains to have a water content of 12–14%, and tempering the raw wheat grains for 16–36 hours to cause the water to penetrate into the inside of the raw wheat grains.

According to another aspect of the invention, there is provided a method of flour milling which may comprise the steps of measuring a water content of particles in the ground wheat grains, comparing the amount of the measured water content with a predetermined target water content of the particles, and adjusting the amount of water to be added during the second water addition if there is a difference between the measured water content and the predetermined target water content.

The features of the invention also include the polishing of the raw wheat grains such that the yield thereof becomes 83–94%; the addition of water, during the second water addition, is carried out such that the water content of the polished wheat grains becomes 15–17%; the polished wheat grains after the second water addition is caused to be stirred and vibrated at the same time while being conveyed to an exit port; and the stirring and vibrating of the polished wheat grains continue for at least three minutes.

According to a further aspect of the invention, there is provided a flour milling apparatus in which, the addition of water is made through the first water adding unit so as to cause the raw wheat grains to have a water content of 12–14%, and the raw wheat grains are tempered in the first tempering unit for 16–36 hours so as to cause the water to penetrate into the inside of the raw wheat grains.

According to still another aspect of the invention, there is provided a flour milling apparatus in which, the control means connected to the second water adding means comprises a detecting means for detecting a water content of particles obtained by the grinding means; a target water content setting means for setting a predetermined target water content of the particles; a comparator for comparing the water content detected by the detecting means with the predetermined target water content set by the target water content setting means and calculating a difference between the detected water content and the target water content; and an adjusting means for outputting an adjusting signal for adjusting the amount of water to be added by the second water adding means according to any difference between the values of the water contents calculated by the comparator.

After the first water addition is made by the first water adding unit such that the water content becomes 12–14%, the grains are held and tempered for 16–36 hours within the first tempering unit, and most of the water content added during this period of time penetrates into the endosperm of the grains.

The water content of the flour obtained by the grinding unit is detected by the detecting unit, and the water content of the flour detected by the detecting unit and the target water content thereof set in advance at the setting means are compared by the comparator whereby a difference between both the water contents is calculated. If the result of the calculation by the comparator shows that the water content of the flour is higher than the target water content, a signal generating means outputs to the second water adding unit a signal for reducing the amount of water proportionally with the magnitude of the difference, whereby the amount of water added to the polished grains by the second water adding unit is reduced. On the other hand, if the result of the calculation by the comparator shows that the water content of the flour is lower than the target water content, a signal generating means outputs to the second water adding unit a signal for increasing the amount of water proportionally with the magnitude of the difference, whereby the amount of water added to the polished grains by the second water adding unit is increased.

The raw wheat grains for which the first tempering by the first tempering unit have been completed are transported to the polishing unit whereby the grains are polished to the yielding of 83–94% with the endosperm exposed.

The polished grains supplied to the second water adding unit are subjected to the second water addition such that the water content of the grains becomes 15–17%, the grains are in their optimal physical condition for the milling, and the water content of the grains becomes optimal as that for a subsequent processing of the flour obtained by the grinding unit.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Figure 1:
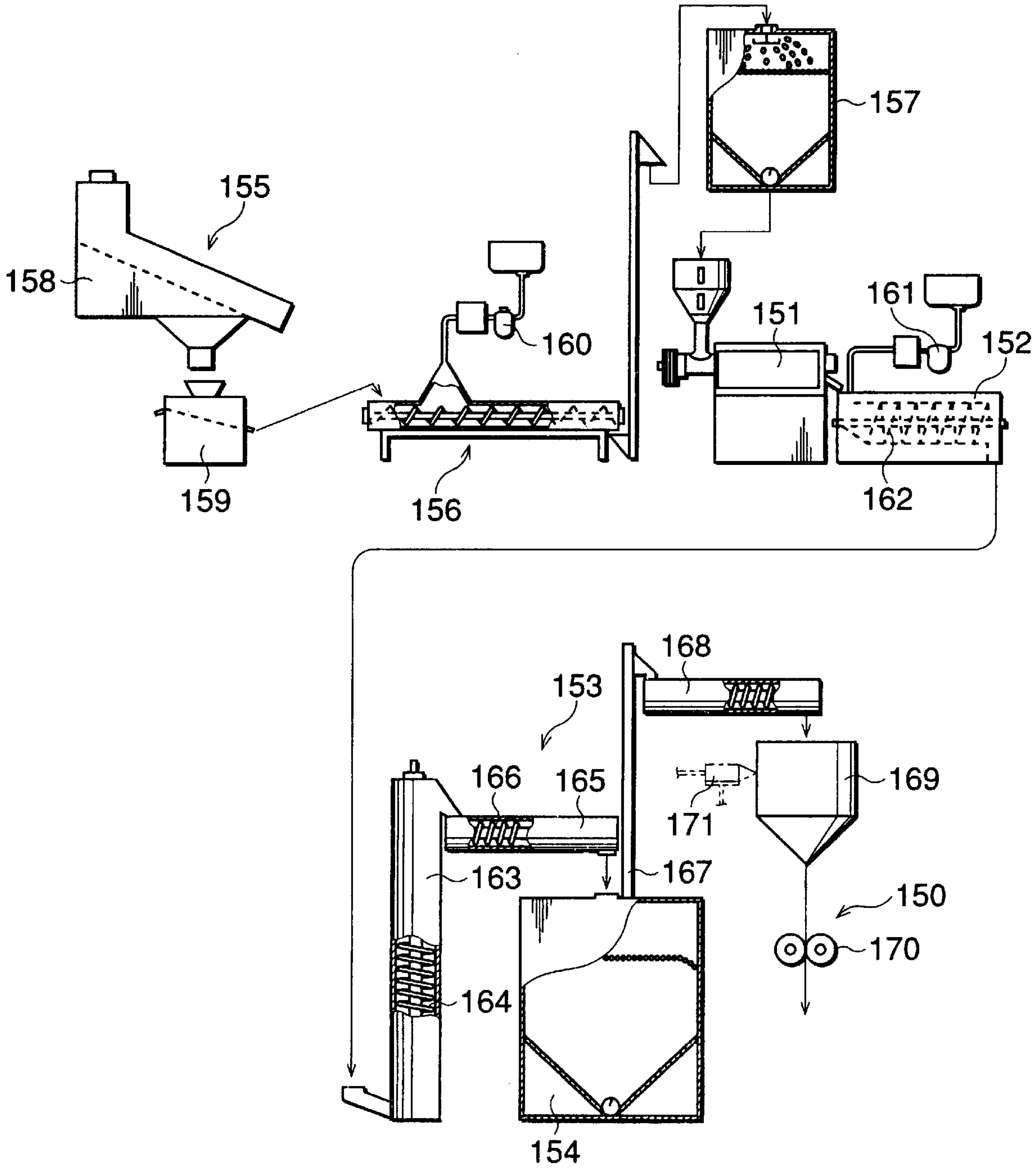
FIG. 1 PRIOR ART
FIG. 1 is a diagrammatic front view showing a general arrangement of a prior art flour milling apparatus.
Figure 2:
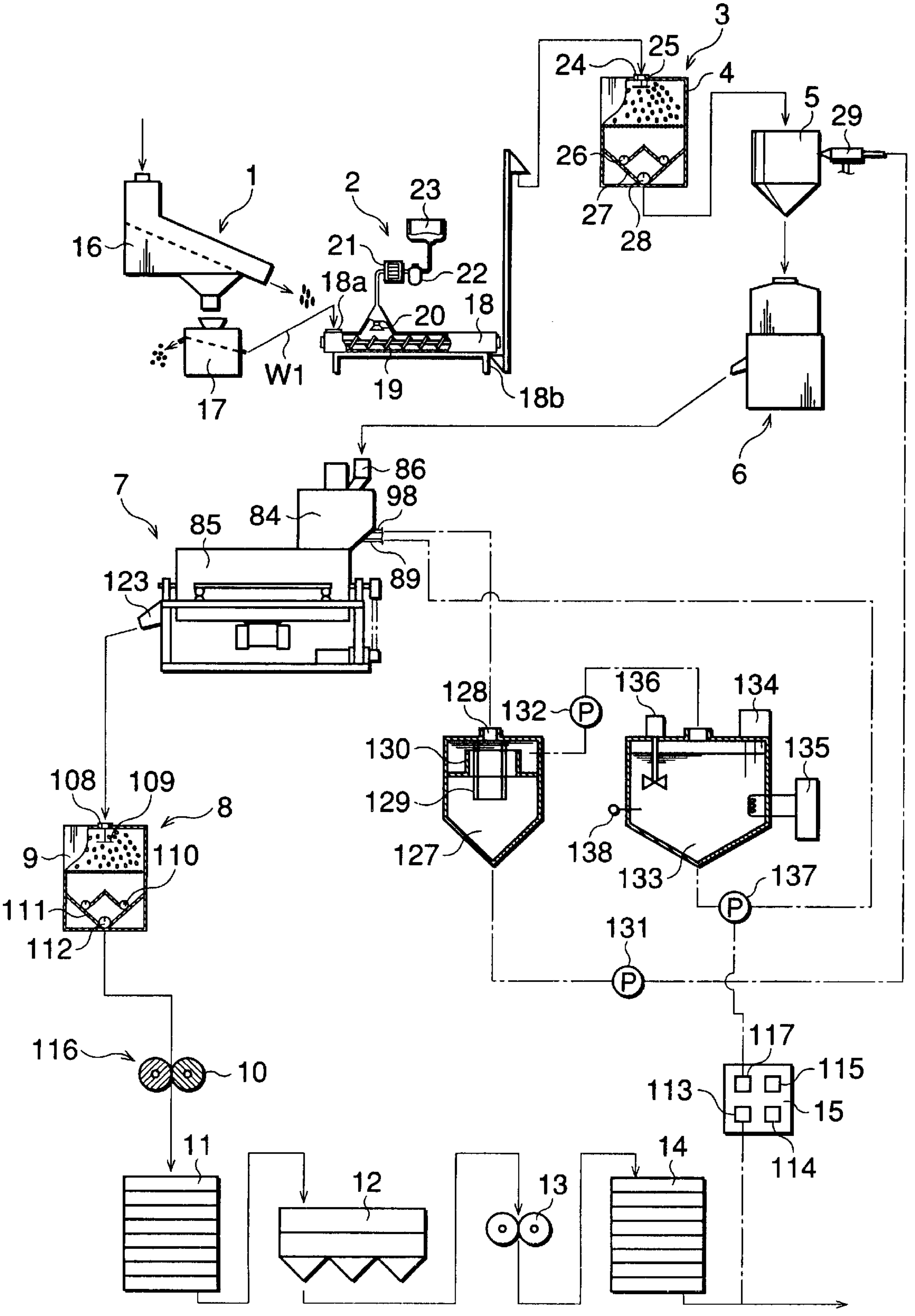
FIG. 2 is a diagrammatic front view showing a general arrangement of a flour milling apparatus of an embodiment according to the invention.

Now, preferred embodiments of the invention are explained with reference to FIG. 2. As means for carrying out treatments before the processing by the polishing unit 6, there are sequentially provided a separator unit 1, a first water adding unit 2, a tempering tank 4 serving as a first tempering unit 3, and a water adding tank 5. Means for carrying out treatments after the processing by the polishing unit 6 includes a second water adding unit 7 and a tempering tank 9 as a second tempering unit 8, and means for carrying out treatments after the tempering tank 9 includes a break roll machine 10 serving as a grinding unit 116, a sifter 11, purifier 12, a smooth roll machine 13, and a sifter 14. Between the second water adding unit 7 and the sifter 14, there is provided a control unit 15 for controlling the amount of water content to be added to the second water adding unit 7 based on the water content of the end flour from the sifter 14.

The first means among the overall flour milling means is the separator unit 1 which includes a coarse separator 16 whose function is to remove light impurities such as straws, plants, wastes and dust, and a stone remover 17 whose function is to remove impurities such as metal and stone pieces from the raw wheat grains that are taken out from, for example, a silo (not shown) to store the raw wheat grains.

Next to the separator unit 1 is provided the first water adding unit 2 with a passage way W1 being interposed. In the first water adding unit 2, there is provided a cylindrical trough 18 which has an inlet 18*a* for the grains at one end, an outlet 18*b* at the other end and a screw conveyor 19 inside thereof. Above the cylindrical trough 18, there is provided a shower nozzle 20 which is connected to a water tank 23 through a heater 21 and an electromagnetic valve 22.

The outlet 18*b* of the first water adding unit 2 is connected to a feeding port 24 of the tempering tank 4 as the first tempering unit 3. The feeding port 24 has a scattering vane means 25 which hangs and rotates therein, and the bottom of the tempering tank 4 has a pair of rotary valves 26 which horizontally extends therein. Underneath the rotary valves 26, there is provided a receiving trough 27 which has a discharging screw conveyor 28 therein. One end of the discharging screw conveyor 28 is connected to an inlet opening of a water adding tank 5 equipped with a water adding nozzle 29. A discharge opening of the water adding tank 5 is connected to the polishing unit 6 which is of a vertically driven type. Details of the polishing unit 6 are hereinafter explained with reference to FIGS. 3 and 4.

Figure 3:
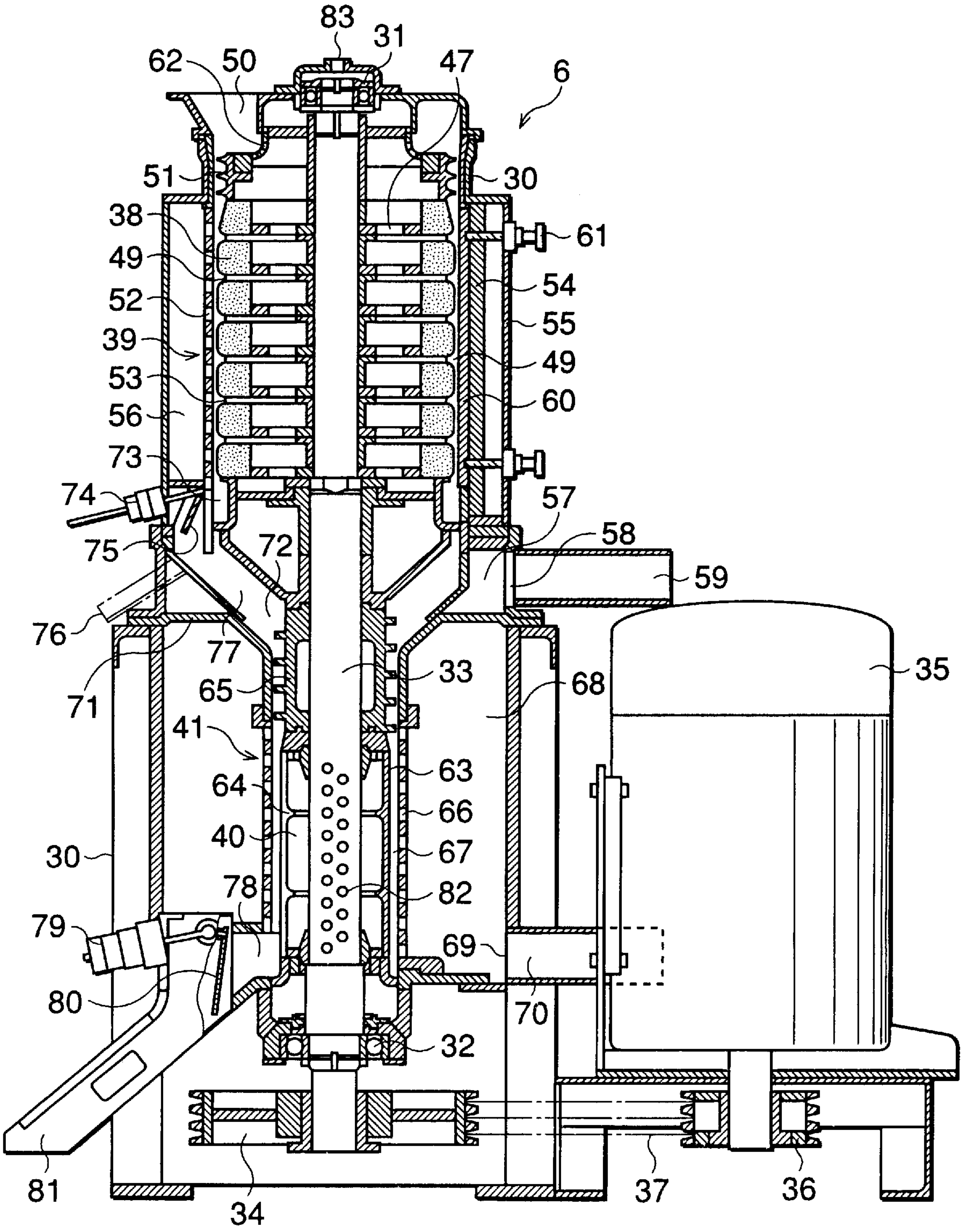
FIG. 3 is a vertical sectional view showing a polishing apparatus shown in FIG. 2.

In FIG. 3 which shows in section an overall view of the polishing unit 6, the numeral 30 represents a machine frame within which a hollow main shaft 33 is vertically and rotatably supported at a center portion thereof by upper and lower bearings 31 and 32. A pulley 34 is provided at a lower portion of the main shaft 33, and this pulley 34 and a pulley 36 of a motor 35 are connected by a V-belt 37 such that the main shaft 33 is rotated at an appropriate rotation speed. An abrasive polishing section 39 provided with abrasive rotors 38 is formed at an upper portion and an frictional polishing section 41 provided with frictional rotors 40 is formed at a lower portion of the machine frame 30. The abrasive polishing section 39 and the frictional polishing section 41 are explained hereunder.

Figure 4:
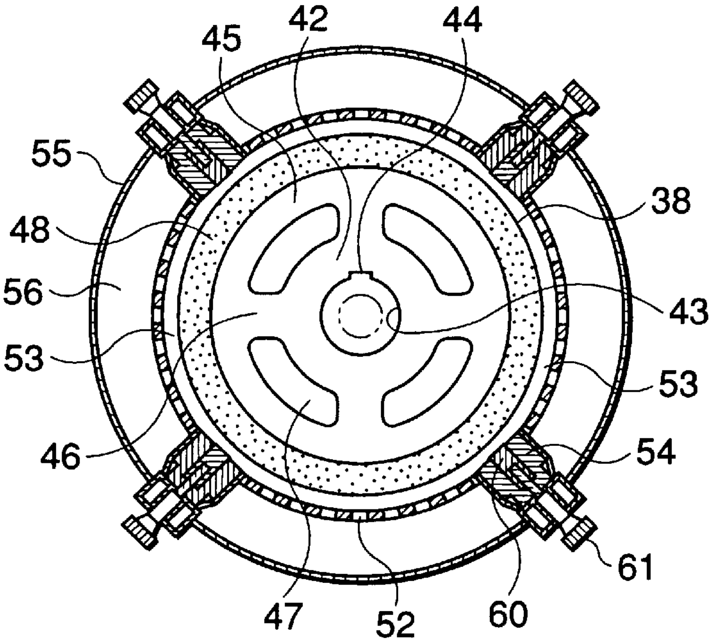
FIG. 4 is a cross sectional view showing an abrasive polishing section of the polishing apparatus shown in FIG. 3.

In the abrasive polishing section 39, there are a plurality of abrasive rotors 38 and, as shown in FIG. 4, a boss 42 of the section has a circular hole 43 and a key groove 44 with the main shaft 33 being inserted in the circular hole 43. The boss 42 and a ring portion 45 are bridged by an arm portion 46 with a plurality of ventilation holes 47 being formed. The ring portion 45 has a fixed polishing portion 48 on which abrasive particles are deposited, and the spaces defined by the respective abrasive rotors 38 constitute jet air gaps 49.

The uppermost abrasive rotor among the plurality of abrasive rotors 38 carries a screwed rotor 51 for conveying to the abrasive rotors 38 the grains from a first feeding inlet 50 provided at the upper end of the machine frame 30. The abrasive rotors 38 are surrounded by a bran removing cylinder 52, and an abrasive polishing chamber 53 is constituted as its main portion by a space between the bran removing cylinder 52 and the abrasive rotors 38. Also, the bran removing cylinder 52 defines a bran collecting chamber 56 with circular covers 55 provided between adjacent ones of four columns 54, and the bran collecting chamber 56 communicates with a circular bran gathering chamber 57 formed thereunder. The bran gathering chamber 57 has at its side portion a bran exit port 58 which communicates with a bag filter and a bran collecting fan (not shown) through a bran transporting duct 59. Each of the columns 54 has a recess at which a resisting bar 60 is loosely held, and the resisting bar 60 is movable to and from the abrasive polishing chamber 53 by an adjusting knob bolt 61.

The bran removing cylinder 52 has at its bottom portion a first outlet 73 for discharging grains from the abrasive polishing chamber 53, and the first outlet 73 is provided with a resisting lid 75 which is urged towards the first outlet 73 by a weight 74. Further, the first outlet 73 is connected to a communicating passage 77 equipped with a sample take-out trough 76 which communicates with the abrasive polishing section 39 and which is for taking out sample grains for purposes of checking a polishing degree of the grains.

Also, the screwed rotor 51 is provided with perforations 62 through which air is supplied to the ventilation holes 47.

Next, the frictional polishing section 41 is explained. The frictional polishing section 41 is provided with frictional rotors 40 having stirring projections 63 and air jetting grooves 64, and a screw rotor 65 disposed above the frictional rotors 40. The frictional rotors 40 are surrounded by a bran removing cylinder 66. A frictional polishing chamber 67 has as its main portion a space between the bran removing cylinder 66 and the frictional rotors 40. A bran collecting chamber 68 is formed between the bran removing cylinder 66 and the machine frame 30, and the bran collecting chamber 68 has at its side portion a bran exit port 69 which communicates with a bag filter (provided separately from the bag filter communicating with the abrasive polishing section 39) and a bran collecting fan through a bran transporting duct 70.

Further, the bran collecting chamber 68 is partitioned by a bran gathering chamber 57 by a partition wall 71.

Also, the screw rotor 65 has at its upper side portion a second feeding inlet 72 which is connected to the communicating passage 77 and is communicated with the abrasive polishing chamber 53 and the frictional polishing chamber 67.

The bran removing cylinder 66 has at its bottom portion a second outlet 78 for discharging the grains from the frictional polishing chamber 67, and the second outlet 78 is provided with a resisting lid 80 which is urged towards the second outlet 78 by a weight 79. The second outlet 78 is connected to a discharging trough 81 for discharging the grains to the outside of the machine.

Also, the frictional polishing section 41 is provided at its main shaft 33 with a plurality of holes 82 for supplying air to the hollow inside of the main shaft 33 through the air jet gaps 64, and the upper end of the machine frame 30 is provided with an opening 83 for supplying air to the hollow inside of the main shaft 33.

Figure 5:
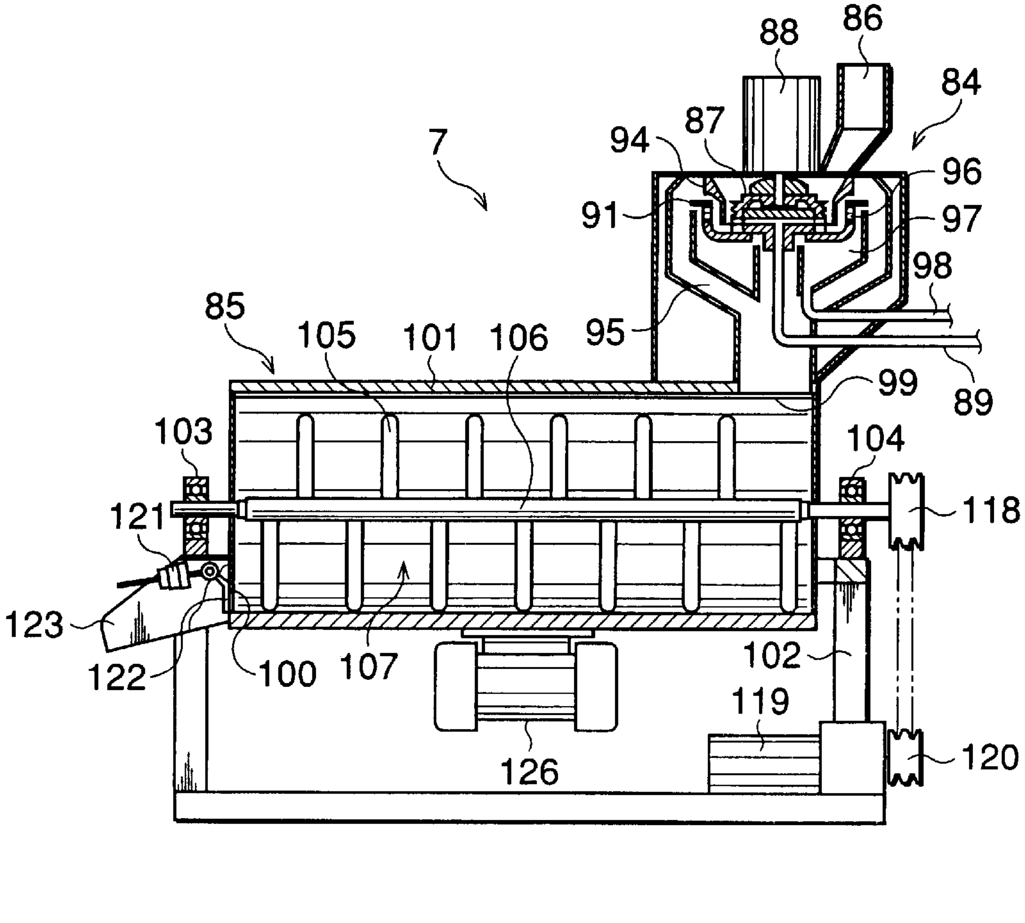
FIG. 5 is a cross sectional view showing a second water adding unit shown in FIG. 2.
Figure 6:
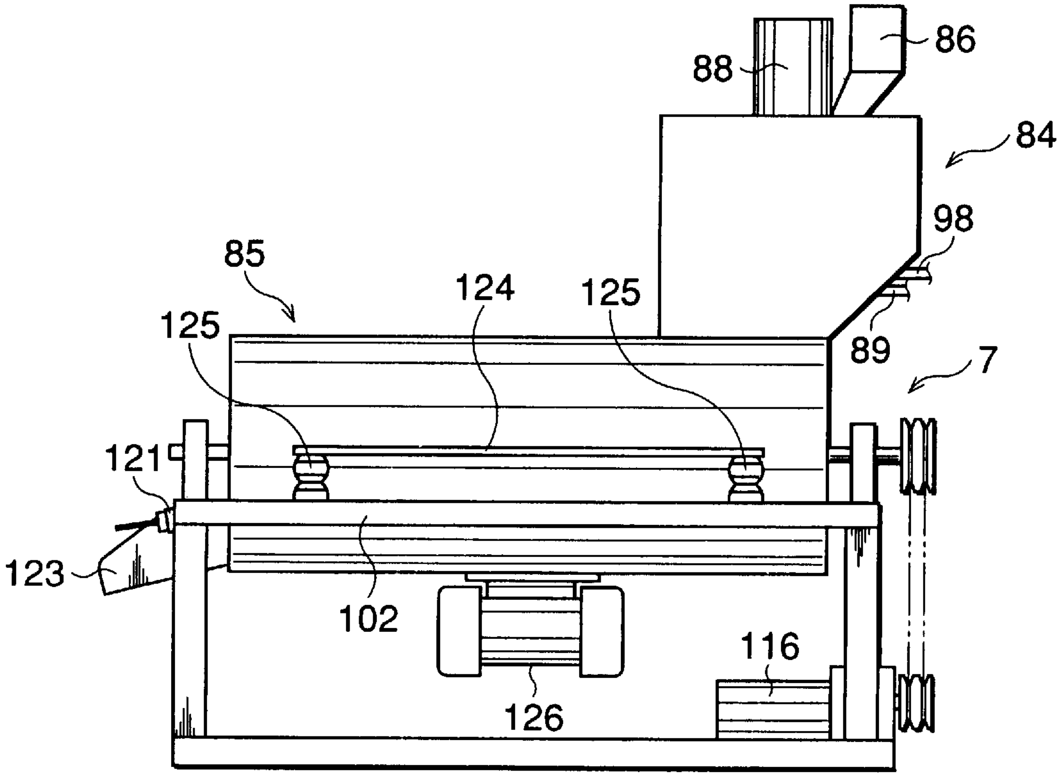
FIG. 6 is a front view showing the second water adding unit shown in FIG. 2.
Figure 7:
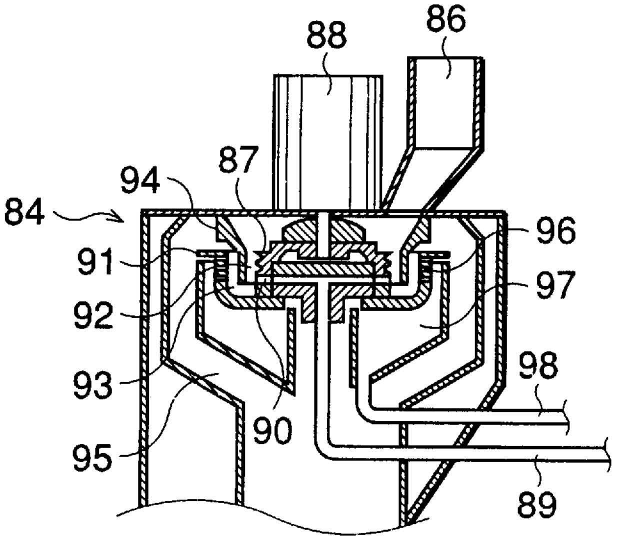
FIG. 7 is a sectional view showing a cleaning section of the second water adding unit shown in FIG. 5.

Means for carrying out processes after the processing by polishing unit 6 includes a second water adding unit 7 which is hereinafter explained with reference to FIGS. 5–7. The second water adding unit 7 is constituted by a cleaning section 84 and a transporting section 85 and, in the cleaning section 84, there is provided a screw rotor 87 which is rotated by a motor 88 for transporting the grains downwardly from a feeding trough 86. The screw rotor 87 is provided at its lower portion with a water supply port 90 which is connected to a water supply duct 89. Fixed to the lower end of the screw rotor 87 is a plate-like rotary cylinder 91 which is bent upwardly and surrounds the periphery of the screw rotor 87. Between the screw rotor 87 and the rotary cylinder 91, there is provided a fixed cylinder 94 which defines a flow passage 92 directed downwardly to the side of the screw rotor 87 and a flow passage 93 directed upwardly to the screw rotor 87 and which surrounds the screw rotor 87 from the above. At the side of the rotary cylinder 91, there is provided a transporting passage way 95 for supplying the grains to the transporting section 85, the grains flowing down over the upper end of the rotary cylinder 91 from the flow passage 93. Also, a part of the rotary cylinder 91 is formed as a perforated wall 96, and the space between the rotary cylinder 91 and the transporting passage way 95 constitutes a collecting chamber 97 for collecting the objects leaked through the perforated wall 96 and, to the collecting chamber 97, a discharging duct 98 for discharging the leaked objects to the outside of the machine is connected.

The transporting section 85 is arranged such that, within a circular machine frame 101 which has at one end an inlet 99 connected to the transporting passage 95 and at the other end an outlet 100, there is provided a stirring unit 107 which has a main shaft 106 having thereon a plurality of stirring vanes 105 and which laterally and centrally extends through the machine frame 101 on a pair of bearings 103 and 104 fixed to a supporting frame 102. On one end of the main shaft 106, there is a pulley 118 which is coupled to a pulley 120 of a motor 119 by a V-belt, and the main shaft 106 is caused to rotate at an appropriate speed. The outlet 100 is provided with a resisting lid 122 which is urged by a weight 121 towards the outlet 100, and an outlet trough 123 for discharging the grains to the outside of the machine is connected to the outlet 100. The machine frame 101 is supported on the supporting frame 102 horizontally (or with the outlet 100 side being positioned slightly lower) by a supporting member 124 projecting from the machine frame 101 and a plurality of joining members 125. The machine frame 101 carries thereunder a vibrating motor 126.

The discharging duct 98 is connected to a first collecting tank 127. Inside the first collecting tank 127, there are provided a transporting cylinder 129 and a partition 130. The transporting cylinder 129 is for allowing the downward flow of the leaked objects introduced through an inlet 128 disposed at an upper portion of the tank 127, and the partition 130 is for making separation between a supernatant fluid and a precipitated fluid of the leaked objects in the tank. The precipitated fluid of the leaked objects is supplied to the water adding nozzle 29 through a pump 131, and the supernatant fluid thereof is supplied to a second collecting tank 133 through a pump 132.

In the second collecting tank 133, there are provided a level detector 134 for detecting an amount of the leaked objects from the first collecting tank 127, a heater 135 for heating the leaked objects to 75°–80° C., a stirrer 136 for stirring the leaked objects, and a temperature detector 138 for detecting the temperature of the leaked objects and making ON—OFF control of the heater 135. The leaked objects heated to 75°–80° C. within the tank is supplied to the water supply duct 89 of the second water adding unit 7 through a pump 137. The pump 137 is connected to the control unit 15 which controls an amount of the leaked objects to be supplied to the water supply duct 89.

The outlet trough 123 of the second water adding unit is connected to a supply port 108 of the tempering tank 9 of the second tempering unit 8. In the supply port 108, there is vertically provided a plurality of rotatable scattering vanes 109 and, at the bottom of the tank, there is laterally provided a pair of rotary valves 110. Also, under the rotary valves 110, there is a receiving trough 111 in which a discharging screw conveyor 112 is provided. The conveying end portion of the screw conveyor 112 is connected to a break roll means 10 which is a first stage unit in the flour milling steps.

As means for flour milling after the break roll means 10, there are provided appropriate means which include a plurality of sifters 11 and 14, a purifier 12 and a smooth roll means 13. Coupled to the sifters 14 is a control unit 15 which includes a water content detector 113 as a means to detect the water content of the end flour discharged from these sifters 14, a water content setting means 114 for setting the target water content of the end flour, a comparator 115 as a means for comparing the target water content set at the water content setting means 114 and the values detected by the water content detector 113 and calculating a difference in the water contents therebetween, and a signal generator 117 as an adjusting means that outputs an adjusting signal to the pump 137 in the case where the difference in the water contents has been produced by the comparator 115.

Now, the function of the apparatus as described above is explained.

The raw wheat grains taken out from, for example, a tank, undergo a process of removing impurities by the coarse separator 16 and also a further process of removing stone and metal pieces by the stone remover 17. The raw wheat grains from which foreign objects have been removed by the removal processes are first introduced into the first water adding unit 2 where the water is added to the grains by the shower nozzle 20. The amount of water is adjusted by the electromagnetic valve 22 such that the water content of the raw wheat grains becomes 12–14% (normal water content of raw wheat grains being about 11%. Where the temperature of water is low as in a winter time, the raising of water temperature by the heater 21 facilitates the water penetration. The raw wheat grains to which the water has been added are stirred and transported by the screw conveyor 19 and, during this period of time, the water added evenly penetrates into the inside of all the grains. Then, the raw wheat grains having been transported by an elevator to the feeding port 24 of the tempering tank 4 are filled in the tempering tank 4 while being scattered by the scattering vane means 25. The wheat grains in the tempering tank 4 are left alone as they are for 16–36 hours so that almost all of the water added penetrates into the endosperm of the wheat grains.

The wheat grains for which the tempering has been completed in the tempering tank 4 flow into the receiving trough 27 by the rotation of the rotary valves 26 and are transported to the water adding tank 5 from the discharging screw conveyor 28.

To the grains having been transported to the water adding tank 5, the atomized water is again added by the water adding nozzle 29. The amount of water added may be to the extent that the water penetrates the epidermis of the grains and be 0.5–2% by weight with respect to the grains. After the water has been added, the grains are held in the water adding tank 5 for 3–5 minutes for the water to penetrate into the epidermis of the grains. Thereafter, the grains are supplied to the first feeding inlet 50 of the polishing unit 6.

The grains supplied to the first feeding inlet 50 are transported to the abrasive polishing chamber 53 of the abrasive polishing section 39 by the screw rotor 51. The grains in the abrasive polishing chamber 53 have their husks removed by the abrasive rotors 38. Bran such as husks removed from the grains is immediately collected at the bran collecting chamber 56 from the abrasive polishing chamber 53 through the bran removing cylinder 52. This is because, due to the suction force of a bran fan (not shown), the outside air is jetted thereinto from the jet air gaps 49 through the first feeding inlet 50, the perforations 62, the screw rotor 51, and the ventilation holes 47 of the abrasive rotors 38. The bran in the bran collecting chamber 56 is transported to a bag filter (not shown) through the bran transporting duct 59.

The grains thus polished in the abrasive polishing chamber 53 are discharged to the communicating passage 77 from the first outlet 73. Under this state, the pressure is generated by the resisting lid 75 which is urged by the weight 74 and, since the grains are discharged against the resisting lid 75, it is possible to maintain an appropriate pressure in the abrasive polishing chamber 53.

The grains discharged to the communicating passage 77 flow down and are moved downwardly from the second feeding inlet 72 by the screw rotor 65, and flow into the frictional polishing chamber 67 of the frictional polishing section 41. The grains in the frictional polishing chamber 67 are stirred by the stirring projections 63 of the frictional rotors 40, and are polished due to grain-to-grain friction caused by rotation and revolution of the grains. At this time, the surface layers of the grains have been abrasively polished by the abrasive rotors 38 thereby increasing their friction coefficient and, for this reason, it is possible to remove the outer layers of the grains sufficiently by the friction rotors 40.

The bran such as husks removed in the frictional polishing chamber 67 are immediately collected at the bran collecting chamber 68 through the bran removing cylinder 66. This is because, due to the suction force of a bran fan (not shown), the outside air is jetted thereinto from the jet air gaps 64 through the opening 83, the hollow inside of the main shaft 33 and the holes 82. The bran in the bran collecting chamber 68 is transported through the bran transporting duct 70 to a bag filter which is different from one that communicates to the abrasive polishing section 39.

The polished grains having undergone the polishing at the frictional polishing chamber 67 are discharged to outside the machine after flowing down through the discharging trough 81 from the second outlet 78. Under this state, the pressure is generated by the resisting lid 80 which is urged by the weight 79 and, since the grains are discharged against the resisting lid, it is possible to maintain an appropriate pressure in the friction polishing chamber 67.

In the flour milling steps, the polishing yield at the polishing unit 6 may preferably be 83–94% (this yield being only for the dried portion without water) in order to collect the endosperm in its optimal form.

The polished grains discharged from the polishing unit 6 are supplied to the feeding trough 86 of the second water adding unit 7. The polished grains fed into the cleaning section 84 from the feeding trough 86 are moved along the inner wall of the fixed cylinder 94 and reach the flow passage 92 between the fixed cylinder 94 and the screw rotor 87. Through the flow passage 92, the polished grains are transported downwardly in an annular form by the rotation of the screw rotor 87. During this time, the water heated to 75°–80° C. at the second collecting tank 133 is radially added to the polished grains from the water supply port 90 of the screw rotor 87. The amount of the water added is adjusted by the pump 137 such that the polished grains become optimal in their physical conditions for the flouring, the water content of the end flour obtained by the grinding process becomes optimal for a subsequent processing of the end flour, and the water content of the polished grains becomes 15–17%.

The polished grains to which the water has been added are once stagnated at a lower portion of the flow passage 92 but, while being subjected to an appropriate pressure generated by the polished grains that are caused to flow down by the screw rotor 87 through the flow passage 92, they are forced upwardly to the flow passage 93 between the fixed cylinder 94 and the rotary cylinder 91 by the stirring and grain-to-grain friction action. During this period, the bran and epidermis particles adhering to the polished grains are separated into the water added. At the flow passage 93, the water is scattered from the perforated wall 96 by the centrifugal force of the rotary cylinder 91, and the bran and the epidermis particles separated from the grains as the leaked objects together with the water are collected at the collecting chamber 97 and transported to the first collecting tank 127 through the discharging duct 98. The polished grains having undergone the water addition and the cleaning flow from the upper edge portion of the rotary cylinder 91 into the transporting passage 95 and are supplied to the transporting section 85. Also, the time period for the polished grains to remain in the flow passages 92 and 93 can be adjusted by regulating the degrees of cleaning and water addition, in which case the revolution of the motor 88 may be changed.

At the first collecting tank 127, the leaked objects from the second water adding unit 7 are separated by the partition 130 into the precipitated fluid containing the bran and epidermis and the supernatant fluid not containing the bran and epidermis. The precipitated fluid is supplied to the water adding nozzle 29 of the water adding tank 5 through the pump 131, and the supernatant fluid is supplied to the second collecting tank 133 through the pump 132. The supernatant fluid in the second collecting tank 133 has its temperature detected by the temperature detector 138, and is heated to 75°–80° C. by the heater 135. The temperature of the water in the second collecting tank 133 is kept uniform by the stirrer 136, and the amount of water therein is monitored by the level detector 134. If the amount of water is low, the water from the water supply unit (not shown) is supplied to the second collecting tank 133. The water whose temperature has been raised to 75°–80° C. in the second collecting tank 133 is supplied to the water supply duct 89 of the second water adding unit 7 through the pump 137.

The polished grains flowed into the transporting section 85 receive the stirring action by the stirring vanes 105 so that the water penetrates into the inside of the grains without adhering together and, due to the vibration generated by the vibrating motor 126, the water that is stagnant at the surface of the inner wall of the machine frame 101 is caused to leave this surface of the inner wall and be in contact with the grains whereby the required satisfactory water addition is ensured. By this time, since almost all of the epidermis of the grains has been removed thus exposing the endosperm of the grains, the penetration of the water into the inside of the grains rapidly progresses.

By the vibrations of the vibrating motor 126, the grains vibrate on the inner wall surface of the machine frame 101 and gradually move towards the outlet 100 from the inlet 99 while receiving the stirring and vibrating action. By the time the grains reach the outlet 100, the water at the surfaces of the grains has penetrated into the inside thereof to the extent that the grains do not adhere to one another. The grains advance against the resisting lid 122 urged towards the outlet 100 by the weight 121 and are discharged to the outside of the machine from the outlet trough 123.

For the water at the grain surfaces to be penetrated into the inside of the grains to the extent that they do not stick to each other, the grains may be stirred and vibrated for at least 3 minutes and, for this purpose, the force generated by the resisting lid 122 due to the weight 121 and the number and the amplitude of vibrations of the vibrating motor 126 may appropriately be adjusted in proportion to the amount of the grains supplied to the second water adding unit 7 and the amount of water supplied to the grains.

The polished grains discharged from the outlet trough 123 of the second water adding unit 7 are transported to the tempering tank 9 serving as the second tempering unit 8, and are filled in the tempering tank 9 while being scattered by the scattering vanes 109 of the tempering tank 9 where the grains are left alone for 0.5–2 hours for a short time tempering.

The polished grains having undergone the tempering at the tempering tank 9 flow into the receiving trough 111 by the rotation of the rotary valves 110 and, after being discharged to the outside of the machine by the discharging screw conveyor 112, the grains are supplied to the break roll machine 10 of the grinding unit 116 where the grinding operation is carried out.

The operations to take place subsequent to the grinding operation of the grinding unit 116 are not explained in detail but, in such operations, the endosperm is taken out in the form of coarse particles by the step-by-step grinding of the polished grains using various break roll machines 10, is classified by the sifter 11, and is further selected and purified by the purifier 12, followed by the grinding by the smooth roll machine 13 and the classifying by the sifter 14. The endosperm of the grain thus taken out is collected as the end flour, and the water content of the end flour is detected by the water content detector 113 of the control unit 15.

The values detected by the water content detector 113 and the target value set in advance in the water content setting means 114 are compared by the comparator 115 for calculating any difference therebetween. If the calculation by the comparator 115 shows that the water content of the end flour is higher than the target water content, the signal generator 117 outputs proportionally to the difference an adjusting signal to the pump 137 for the amount of water supply to the water supply duct 89 to be decreased and, as a result, the water supply to the grains in the second water adding unit 7 is reduced in proportion to the difference. If, on the other hand, the calculation by the comparator 115 shows that the water content of the end flour is lower than the target water content, the signal generator 117 outputs proportionally to the difference an adjusting signal to the pump 137 for the amount of water supply to the water supply duct 89 to be increased and, as a result, the water supply to the grains in the second water adding unit 7 is increased in proportion to the difference.

In the above described embodiment, in the tempering tank 9 of the second water adding unit 8, the tempering for the grains from the second water adding unit is conducted by having the grains left alone. However, this tempering can be conducted by providing a plurality of rubber bags, which are expanded and contracted by the putting of air in and out, at a position above the rotary valve 110 of the tempering tank 9, and these bags may be continually expanded and contracted as the tempering of the grains progresses. In such a case, since the grains are caused to flow due to the constant expansion and contraction of the bags, it is possible to conduct the uniform tempering of the overall grains within the tempering tank 9 so that, even when the water content at the surface portion of the grains transported from the second tempering unit 7 is high, there is no likelihood of the grains to stick to one another.

In the above described embodiment, the temperature of the water supplied to the second water adding unit 7 is 75°–80° C. With this temperature of 75°–80° C., it is possible to make a significant reduction in the total aerobic bacteria (measured by Standard Plate Colony method) in the water discharged from the discharging duct 98.

Table 1 shows the total aerobic bacteria in the discharged water when the temperatures of the water supplied are changed.

TABLE 1

| TEMPERATURE (°C.) | TOTAL AEROBIC BACTERIA IN THE DISCHARGED WATER (Number/g) |
|---|---|
| 20 | 200 |
| 60 | 72 |
| 70 | 10 |
| 75 | 0 |
| 80 | 0 |

The table shows the total aerobic bacteria in the discharged water when the polished grains are cleaned in the supplied water respectively at the temperatures of 20° C., 60° C., 70° C., 75° C. and 80° C. For the testing:

(1) The polished grains were cleaned with the water in the same amount as those of the grains and under each of the temperatures shown.

(2) From the discharged water after the cleaning of the grains, a sample of 1 ml was taken.

(3) The sample of the discharged water was left alone for 24 hours under 37° C. on an agar culture medium.

(4) The number of colonies developed on the culture medium was calculated.

As is apparent from Table 1, when the grains are cleaned using the water of 75°–80° C., no aerobic bacteria are present in the discharged water so that, as in the above described embodiment, the water can be reused as the water to be added.

When the water is under 75° C., the total aerobic bacteria are reduced. Table 2 shows the total aerobic bacteria in the polished grains when they were cleaned using the water under the temperatures of 75° C. and 20° C.

TABLE 2

| TEMPERATURE (°C.) | TOTAL AEROBIC BACTERIA IN POLISHED WHEAT GRAINS (Number/g) |
|---|---|
| 20 | 100 |
| 75 | 2 |

The table shows the results of groups of tests when the grains were cleaned using the water of 20° C. and 75° C. For the testing:

(1) The polished grains were cleaned with the water of 75° C. and 20° C.

(2) Water was added to the grains in the ratio of 9 to 1 after the cleaning, and the stirring was made.

(3) The solution resulting from the stirring was diluted to 10 times, and a sample 1 ml was taken.

(4) The sample of the diluted solution was left alone for 24 hours under 37° C. on an agar culture medium.

(5) The number of colonies developed on the culture medium was calculated.

It is seen in Table 2 that the total aerobic bacteria in the polished grains cleaned using the water of 75° C. are 1/50 of that in the polished grains cleaned using the water of 20° C. It is noted that the total aerobic bacteria in the end flour obtained by the milling of the polished grains cleaned using the water of 75 degrees are very small.

In summary, the effects of the invention achieved may be explained as follows:

By adding water during the first water addition to cause the raw wheat grains to have a water content of 12–14%, and tempering the raw wheat grains for 16–36 hours to cause the water to penetrate into the inside of the raw wheat grains, it is possible to ensure that, during the first tempering, the sufficient water completely penetrates into the inside of the endosperm of the raw wheat grains so that the amount of water to be added at the second water addition can be decreased and the time required for the second tempering can reduced to 0.5–2 hours. Thus, the epidermis of the polished grains prior to the milling process does not become dried so that there is no need to add any water immediately before the milling process.

By measuring a water content of the particles obtained by the grinding of the grains, comparing the amount of the water content thus obtained with a predetermined target water content of the particles, and adjusting the amount of water content to be added during the second water addition if there is a difference between the obtained water content and the predetermined target water content, it is possible to ensure that, even when the water content of the particles is different from the target water content, the amount of water to be added during the second water addition can immediately be adjusted. Thus, it is possible to produce the particles whose water content always corresponds to the target water content, and the process does not suffer from any decrease in the yield and does not require the adding of any water to the particles.

By polishing the raw wheat grains such that the yield thereof becomes 83–94%, it is possible to ensure that the epidermis of the raw wheat grains is almost completely peeled off so that, by the time of the second water addition, the endosperm of the grains has been exposed so as to allow the quick penetration of water into the inside of the grains. Thus, during the milling operation, it is possible to collect the endosperm of the grains in a satisfactory manner.

By adding water, during the second water addition, such that the water content of the polished wheat grains becomes 15–17%, it is possible to ensure that, since the physical conditions of the polished grains become optimal for the milling, the separation between the endosperm and the epidermis is easily made thus enabling the satisfactory collection of the endosperm. Also, it can be ensured that the water content of the end flour obtained from the grinding operation results in an optimal water content for a subsequent use of the end flour.

By causing the polished wheat grains after the second water addition to be stirred and vibrated at the same time while being conveyed to an exit port, it is possible to ensure that the polished grains do not stick to one another and also that the polished grains do not become stagnated in their passage.

By continuing the stirring and vibrating of the polished wheat grains continue for at least three minutes, it is possible to ensure that the water at the surface layer of the polished grains is in an extent of amount that prevents the polished grains from sticking to one another. Since the water at the surface layer penetrates to the endosperm, there is no likelihood that the polished grains stick to one another after the stirring and vibrating transportation thereof.

By adding water through the first water adding unit so as to cause the raw wheat grains to have a water content of 12–14%, and tempering the raw wheat grains in the first tempering unit for 16–36 hours so as to cause the water to penetrate into the inside of the raw wheat grains, it is possible to ensure that the water content of the water to be supplied in the second water supply unit can be decreased and the time required for the tempering in the second tempering unit can also be decreased.

By arranging the control means connected to the second water adding means to comprise a detecting means for detecting a water content of particles obtained by the grinding means; a target water content setting means for setting a predetermined target water content of the particles; a comparator for comparing the water content detected by the detecting means with the predetermined target water content set by the target water content setting means and calculating a difference between the detected water content and the target water content; and an adjusting means for outputting an adjusting signal for adjusting the amount of water to be added by the second water adding means according to any difference between the values of the water contents calculated by the comparator, it is possible to ensure that, even when the water content of the particles and the target water content are different from each other, the amount of the water to be added to the second water adding means can immediately be adjusted whereby the particles always having the target water content can be obtained.

While the invention has been described in its preferred embodiments, it is to be understood that the words which have been used are words of description rather than limitation and that changes within the purview of the appended claims may be made without departing from invention as defined by the claims.

What is claimed is:

1. A method of milling flour which includes polishing raw wheat grains after adding water to the raw wheat grains at a first stage and tempering the raw wheat grains, and grinding the polished wheat grains after adding water to the polished wheat grains at a second stage and tempering the polished wheat grains, said method comprising:

adding water during said water addition at the first stage to cause said raw wheat grains to have a water content of 12–14%, and tempering said raw wheat grains for 16–36 hours to cause the water to penetrate into the inside of said raw wheat grains.

2. A method of milling flour according to claim 1, further comprising measuring a water content of particles in the ground wheat grains, comparing the amount of the measured water content with a predetermined target water content of the particles, and adjusting the amount of water to be added during said water addition at the second stage if a difference exists between said measured water content and said predetermined target water content.

3. A method of milling flour according to claim 1, in which the polishing of said raw wheat grains is carried out such that the yield thereof becomes 83–94%.

4. A method of milling flour according to claim 2, in which the polishing of said raw wheat grains is carried out such that the yield thereof becomes 83–94%.

5. A method of milling flour according to claim 1, in which said water addition at the second stare comprises adjusting a water content of the polished wheat grains to 15–17%.

6. A method of milling flour according to claim 2, in which said water addition at the second stare comprises adjusting a water content of the polished wheat grains to 15–17%.

7. A method of milling flour according to claim 3, in which said water addition at the second stage comprises adjusting a water content of the polished wheat grains to 15–17%.

8. A method of milling flour according to claim 1, further comprising stirring and vibrating the polished wheat grains after said water addition at the second stare at a same time while conveying the wheat grains to an exit port.

9. A method of milling flour according to claim 2, further comprising stirring and vibrating the polished wheat grains after said water addition at the second stage at a same time while conveying the wheat grains to an exit port.

10. A method of milling flour according to claim 3, further comprising stirring and vibrating the polished wheat grains after said water addition at the second stage at a same time while conveying the wheat grains to an exit port.

11. A method of milling flour according to claim 5, further comprising stirring and vibrating the polished wheat grains after said water addition at the second stage at a same time while conveying the wheat grains to an exit port.

12. A method of milling flour according to claim 8, in which the stirring and vibrating of the polished wheat grains continue for at least three minutes.

13. A method of milling flour according to claim 5, in which the water added to the polished wheat grains during said water addition at the second stage has a temperature from about 75° C. to about 80° C.

14. An apparatus for flour milling comprising:

a first water adding means for adding water to raw wheat grains;

a first tempering means for tempering the raw wheat grains after the first addition of the water;

a polishing means for polishing the raw wheat grains after the first tempering;

a second water adding means for adding water to the polished wheat grains after the polishing;

a second tempering means for tempering the polished wheat grains after the second addition of the water; and a grinding means for grinding the polished wheat grains after the second tempering, said first water adding means being for adding water to cause said raw wheat grains to have a water content of 12–14%, and said first tempering means being for tempering said raw wheat grains for 16–36 hours to cause the water to penetrate into the inside of said raw wheat grains.

15. An apparatus for flour milling according to claim 14, which further comprises a control means connected to said second water adding means, said control means having:

a detecting means for detecting a water content of particles obtained by said grinding means;

a target water content setting means for setting a predetermined target water content of said particles;

a comparator for comparing said water content detected by said detecting means with said predetermined target water content set by said target water content setting means and calculating a difference between said detected water content and said target water content; and an adjusting means for outputting an adjusting signal for adjusting the amount of water to be added by said second water adding means according to the difference between the values of the water contents calculated by said comparator.

16. An apparatus for flour milling according to claim 14, in which said second water adding means includes a heating means for heating the water added to the polished wheat grains to a temperature from about 75° C. to about 80° C.

* * * * *

UNITED STATES PATENT AND TRADEMARK OFFICE
CERTIFICATE OF CORRECTION

PATENT NO. : 5,773,066

DATED : June 30, 1998

INVENTOR(S) : Satake et al.

It is certified that error appears in the above-identified patent and that said Letters Patent is hereby corrected as shown below:

Column 8, line 25, after "11%" insert --)--.

Claim 6, line 2, "stare" should be --stage--.

Claim 8, line 3, "stare" should be --stage--.

Signed and Sealed this

Nineteenth Day of January, 1999

*Attest:*

*Attesting Officer*

*Acting Commissioner of Patents and Trademarks*